(12) United States Patent
Brown et al.

(10) Patent No.: US 6,193,274 B1
(45) Date of Patent: Feb. 27, 2001

(54) VEHICLE SUBFRAMES

(75) Inventors: Richard Peter Brown, Stratford-upon-Avon; Christopher Mark Edwards, Birmingham, both of (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/211,564

(22) Filed: Dec. 15, 1998

(30) Foreign Application Priority Data

Dec. 20, 1997 (GB) .................................................. 9726823
Dec. 20, 1997 (GB) .................................................. 9726825

(51) Int. Cl.$^7$ ................................................. B62D 21/15
(52) U.S. Cl. ........................ 280/784; 280/785; 296/194; 296/203.02
(58) Field of Search .................................. 280/784, 785, 280/781, 796, 795, 798; 180/311; 296/194, 203.02, 187, 193, 204

(56) References Cited

U.S. PATENT DOCUMENTS

| 3,520,552 | * | 7/1970 | Graham et al. ........................ 280/784 |
| 3,819,224 | | 6/1974 | Casey et al. ........................ 296/28 R |
| 4,194,763 | * | 3/1980 | Reidelbach et al. .................. 280/784 |
| 4,358,152 | | 11/1982 | Mayer et al. . | |
| 4,613,184 | | 9/1986 | Rispeter et al. . | |
| 4,781,398 | | 11/1988 | Uebelstadt et al. . | |
| 5,358,300 | * | 10/1994 | Gray .................................. 296/194 X |
| 5,372,216 | * | 12/1994 | Tsuji et al. ........................ 280/784 X |
| 5,853,195 | * | 12/1998 | Le et al. ................................ 280/784 |
| 5,862,877 | * | 1/1999 | Horton et al. .................... 280/781 X |

FOREIGN PATENT DOCUMENTS

| 2239485 | * | 2/1975 | (DE) ...................................... 280/784 |
| 3522447 | | 7/1986 | (DE) . |
| 0798197 A1 | | 2/1997 | (EP) . |
| 1 327 178 | | 8/1973 | (GB) . |
| 1 419 698 | | 12/1975 | (GB) . |
| 1462464 | | 1/1977 | (GB) . |
| 2055704 | | 3/1981 | (GB) . |
| 2090795 | | 7/1982 | (GB) . |
| 2235660 | | 3/1991 | (GB) . |
| 2295993 | | 6/1996 | (GB) . |
| 97/41010 | | 11/1997 | (WO) . |

* cited by examiner

Primary Examiner—Brian L. Johnson
Assistant Examiner—F. Zeender
(74) Attorney, Agent, or Firm—Davis and Bujold

(57) ABSTRACT

A vehicle bumper assembly comprises a bumper armature and a front portion of a subframe both attached by brackets to the front of crumple zones in longitudinal parts of the body structure and to the side sections of the subframe. The subframe front portion is longitudinally level with the armature but vertically below it, and an outer bumper panel covers both the armature and the subframe front portion.

14 Claims, 5 Drawing Sheets

VEHICLE SUBFRAMES

FIELD OF THE INVENTION

The present invention relates to subframes for the front of vehicles.

BACKGROUND OF THE INVENTION

It is known, for example from GB2235660, U.S. Pat. No. 4,781,398, GB2090795 and DE3522447 to provide a vehicle subframe which carries various components of the vehicle, such as steering and suspension components, and is arranged to deform on impact to absorb energy thereby helping to protect occupants of the vehicle in the event of a crash.

However the structures disclosed in these documents do not maximize the ability of the subframe to contribute to effective energy absorption, and the present invention aims to improve upon them.

SUMMARY OF THE INVENTION

The present invention provides a vehicle having a longitudinal axis, a body, at least one component, and a subframe mounted on the body and arranged to carry said at least one component, wherein the body includes two longitudinal beams extending substantially parallel to the longitudinal axis and having front ends, and at least one transverse impact absorbing member to which, or to one of which, said front ends are connected, and the subframe includes two longitudinal sections extending substantially parallel to the longitudinal beams and substantially as far forwards, and having front ends connected to said transverse impact absorbing member or one of said transverse impact absorbing members.

DESCRIPTION OF THE PREFERRED EMBODIMENTS

Figure 1:
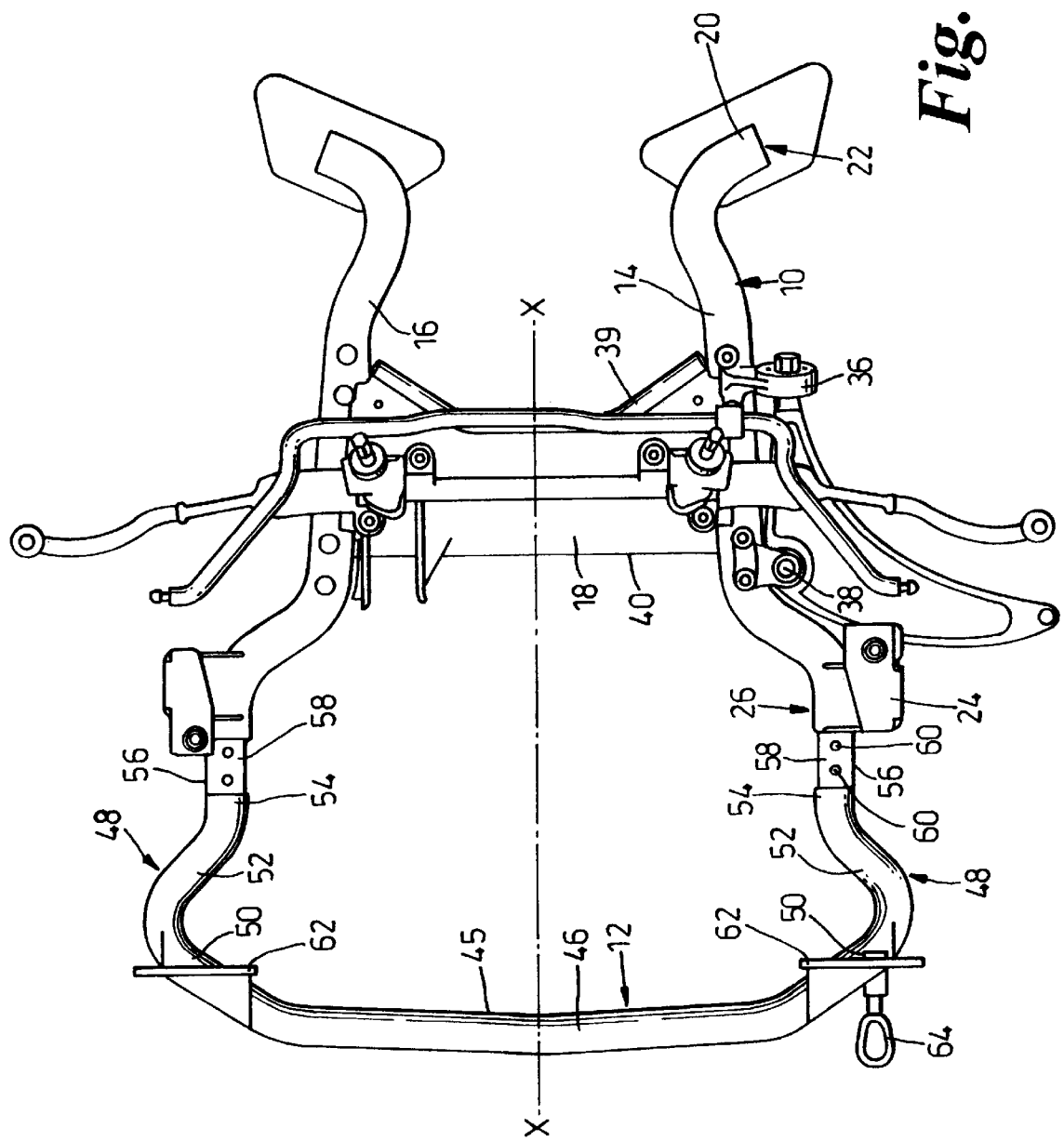
FIG. 1 is a plan view of a vehicle subframe according to a first embodiment of the invention.
Figure 2:
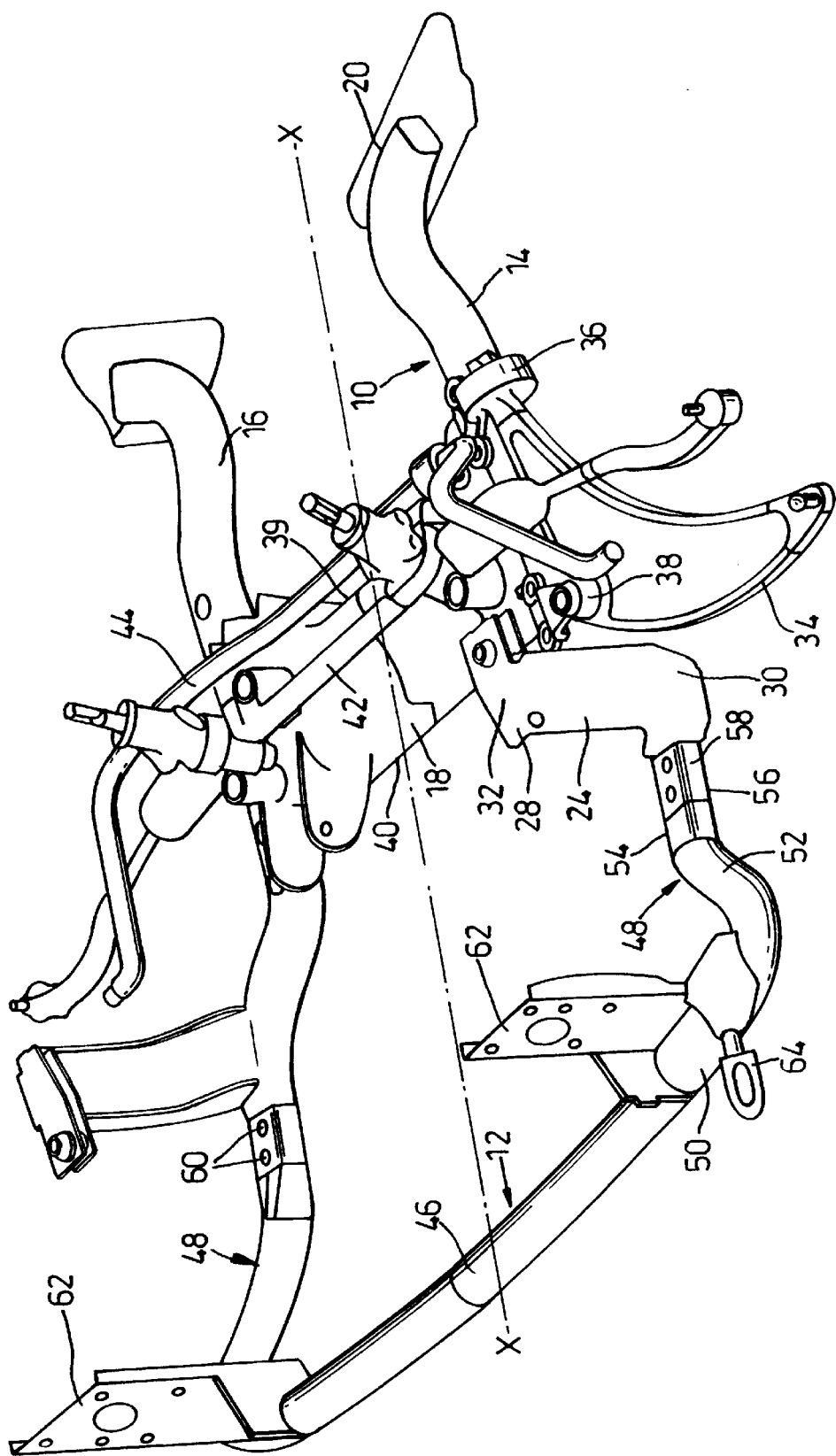
FIG. 2 is a perspective view of the assembly of FIG. 1.
Figure 3:
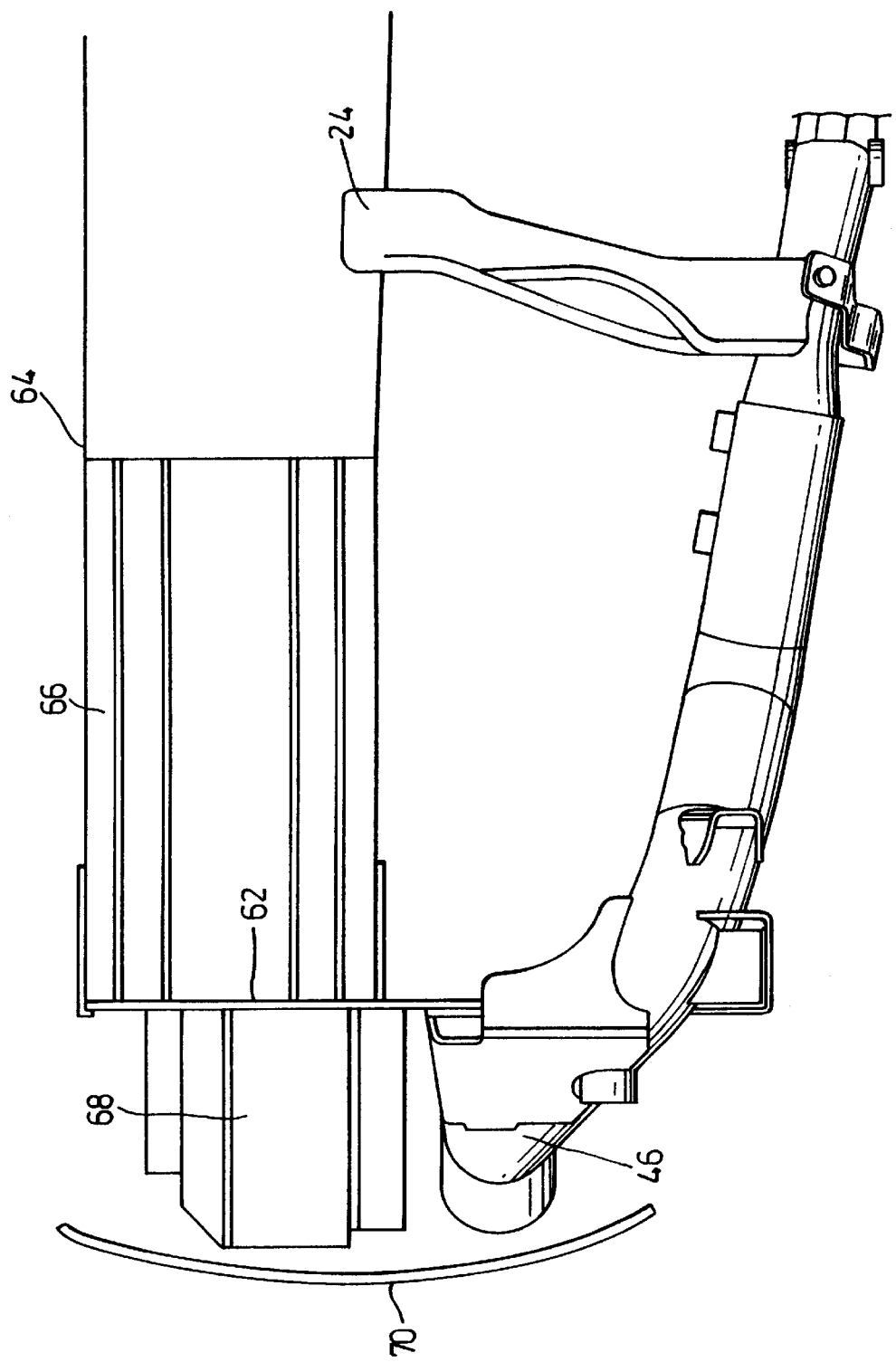
FIG. 3 shows the front part of a vehicle including the subframe of FIGS. 1 and 2.

Referring to FIGS. 1 to 3, a vehicle subframe comprises a rear part 10 and a front part 12. The rear part 10 comprises a pair of side sections 14, 16 extending approximately parallel to the longitudinal axis X—X of the vehicle, and a transverse cross beam 18 joined at its ends to the side sections 14, 16 approximately mid-way between their ends. Each side section 14, 16 is attached to the vehicle body at two points: a rear mounting 20 at its rear end 22 and a front mounting 24 at its front end 26. Each front mounting 24 comprises a mounting bracket 28 which has lower end 30 attached to the side section 14, 16 and its upper end 32 attached to the vehicle body.

The rear part 10 of the subframe therefore forms a rigid H-shaped support, attached to the vehicle body at each corner, to which various components of the vehicle can be attached. Specifically, a suspension arm 34 is mounted on each side section 14, 16 by means of a pair of bushes 36, 38. One of these 36 is approximately level with the rear edge 39 of the cross beam 18, and has a horizontal axis parallel to that of the cross beam 18, and the other 38 is approximately level with the front edge 40 of the cross beam 18 and has a vertical axis. Together the bushes 36, 38 define a pivot axis, extending substantially parallel to the side section 14, 16, about which the suspension arm 34 can pivot, allowing vertical movement of the wheel mounted on it.

A steering rack 42 is also mounted on the cross beam 18, as is an anti-roll bar 44.

The front part 12 of the subframe is formed from a piece of tubing 45 which is bent so as to form a front portion 46 arranged to extend across the vehicle and two side portions 48 extending rearwardly from the ends of the front portion. Each of the side portions 48 includes a first portion 50 extending outwards and rearwards from the end of the front portion 46 and a second portion 52 extending inwards and rearwards from the rear end of the first portion, which together form a crumple zone in the subframe, and a third portion 54 extending rearwardly, parallel to the longitudinal axis X—X of the vehicle, from the rear end of the second portion 52. At the free end of each of the third portions 54, the tube 45 ends in a straight joint portion 56, which is arranged to be a sliding fit into a joint portion 58 at the front end of the corresponding side section 14, 16 of the rear part 10 of the subframe, just forward of the mounting brackets 28. Aligned holes 60 through the joint portions 56, 58 allow the front and rear parts 10, 12 of the subframe to be releasably bolted together.

A sheet metal front mounting bracket 62 is welded at its lower end onto the front part 12 of the subframe at each end of the front portion 46 where it joins the front end of the side portions 48. These brackets extend vertically upwards from the subframe and are attached at their upper ends to the front end of respective longitudinal structures 64 in the vehicle body.

As is shown in FIG. 3, the longitudinal structures 64 each have a crumple zone 66 at the front end, the brackets 62 being attached to the front end of the crumple zones. The subframe front part 12 is situated below the longitudinal structures 64.

A bumper armature 68 is also attached to the brackets 62 above the subframe front portion 46 and level with the longitudinal structures 64. The armature extends across the front of the vehicle substantially parallel to the subframe front portion 46 and above it, the front edges of the armature 68 and the subframe front portion being substantially level along the longitudinal axis of the vehicle.

An outer bumper member 70 comprising an integral part of a body panel of the vehicle, is situated on front of the armature 68 and subframe front portion 46, covering them both but spaced slightly away from them.

The front mounting points 24 of the rear part 10 of the subframe are attached to the longitudinal structures to the rear of the crumple zones 66.

In the event of a frontal impact with, for example, a pedestrian, the load of the bumper assembly on the pedestrian, and hence also the load of the pedestrian on the bumper assembly, provided that load is sufficient to deform the outer bumper panel 70, is spread between the armature 68 and the subframe front portion 46. This spreading of load can help to reduce injury to the pedestrian.

Also the energy of the impact received both by the armature and the subframe front portion 46 is transmitted by the brackets 62 into the crumple zones 66 in the body and those 50, 52 in the subframe side portions 48 which can therefore crumple together to absorb the impact energy whilst being held in a parallel relationship to each other by the brackets 62. Because the subframe extends forwards to the front of the vehicle, level with the bumper armature and the front ends of the body longitudinal structures 64, it is effective in absorbing impact energy from almost the moment of impact.

Figure 4:
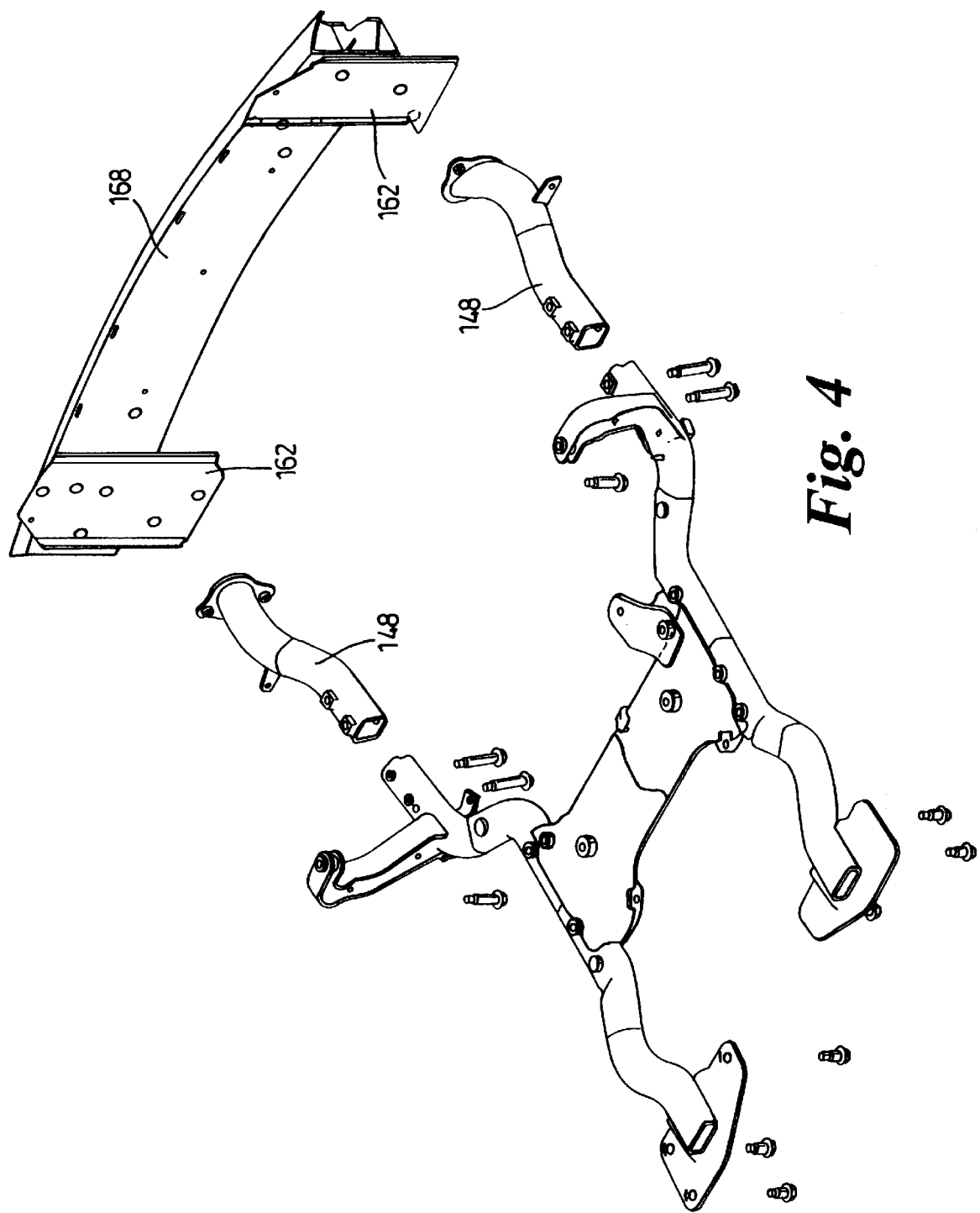
FIG. 4 is perspective view of a subframe and bumper assembly forming part of a vehicle according to a second embodiment of the invention.
Figure 5:
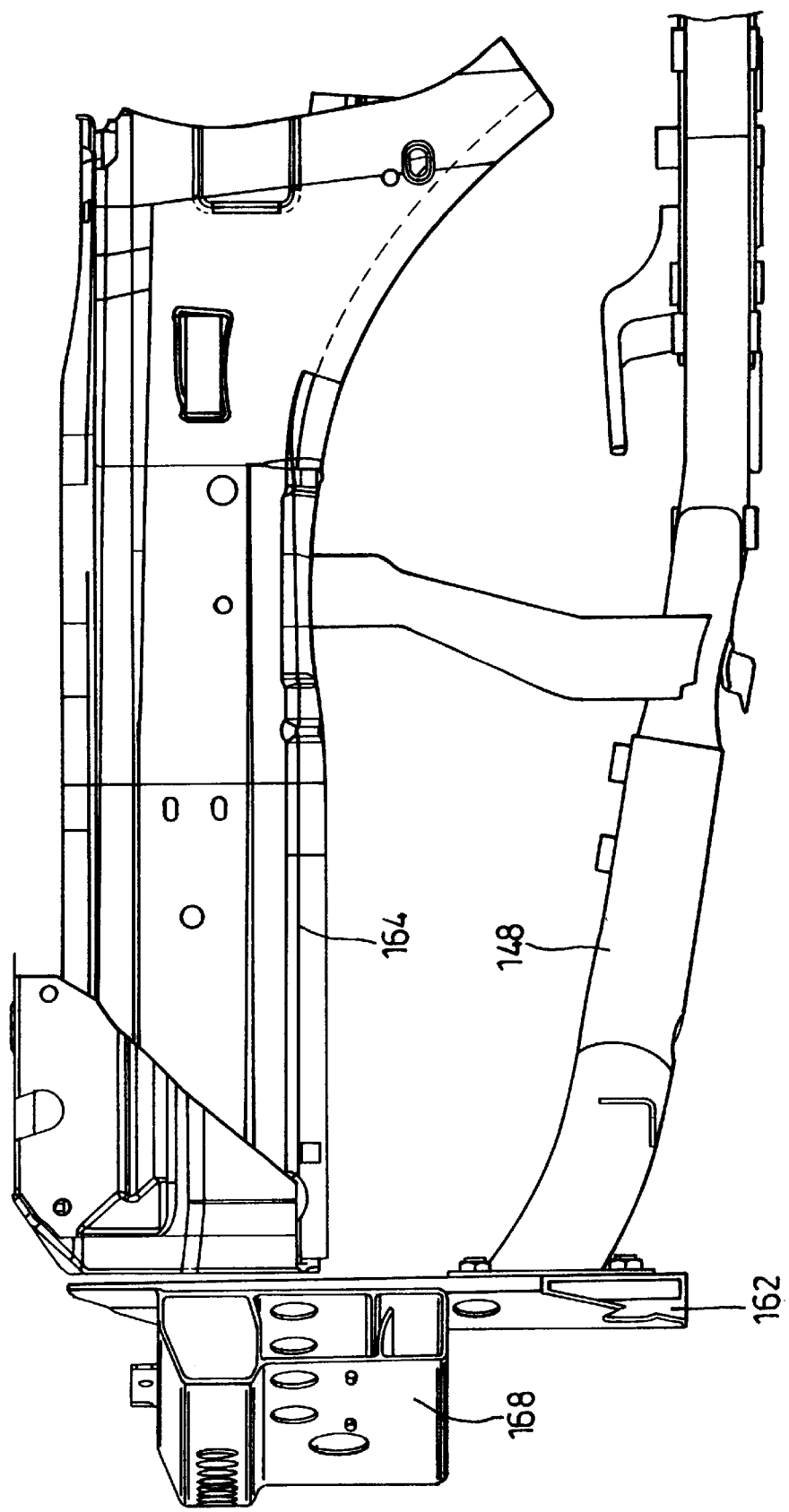
FIG. 5 is a side view of part of the assembly of FIG. 4.

Referring to FIGS. 4 and 5 a second embodiment of the invention is similar to the first, with corresponding parts given the same reference numeral preceded by a 1. The difference with the second embodiment is that the front portion 46 of the subframe is omitted, and the front ends of the two side portions 148 are bolted onto the bottom ends of the front mounting rackets 162 on which the bumper armature 168 is mounted. The bumper armature therefore takes all of the load in a frontal impact, but this load is still reacted back through the subframe side portions 148 and the longitudinal body structures 164 in parallel. Because the subframe side portions 148 and the longitudinal body structures 164 are substantially parallel to each other and the brackets 162 connect them both rigidly to the bumper armature 168, in the event of a frontal impact they deform by crumpling simultaneously whilst remaining substantially parallel with each other. The subframe therefore contributes significantly to the energy absorbing capability of the overall structure which is stiffer than if either the body structure 164 or the subframe 110 acted alone to absorb the energy.

We claim:

1. A vehicle having a framework which facilitates deformation during a collision to absorb energy and protect occupants of the vehicle, the vehicle comprising:
    a vehicle body including two longitudinal beams extending substantially parallel to a longitudinal axis of the vehicle, the two longitudinal beams each having a front end;
    a transverse impact absorbing member attached to and extending between the front ends of the two longitudinal beams;
    a disconnectable vehicle subframe supported by the vehicle body, the disconnectable subframe including two longitudinal subframe members spaced apart from one another and extending substantially parallel to the longitudinal beams, each of the longitudinal subframe members having a front end positioned substantially adjacent to and connected with the transverse impact absorbing member;
    a portion of the front ends of the two longitudinal subframe members support a front portion extending transversely with respect to the longitudinal axis of the vehicle, each opposed end of the front portion has an impact absorption portion which extends rearwardly from the front portion and forms a subframe member crumple zone; and
    each impact absorption portion supported by each opposed end of the front portion comprises, in relation to the longitudinal axis of the vehicle, a first portion extending outwardly and rearwardly connected to a second portion extending inwardly and rearwardly connected to a third portion extending rearwardly and parallel to the longitudinal axis of the vehicle.

2. The vehicle according to claim 1, wherein the front portion and the first, second and third portions are formed from a contiguous tube, and the third portion has a straight joint portion aligned to have a sliding fit with a mating straight joint portion supported by a front end portion of the longitudinal subframe members to facilitate coupling of the mating straight joint portions with one another.

3. The vehicle according to claim 1, wherein a transverse cross beam interconnects intermediate sections of the two longitudinal subframe members with one another and a rear part of the subframe forms a rigid H-shaped support.

4. The vehicle according to claim 3, wherein the transverse impact absorbing member is a bumper armature extending transversely of the longitudinal axis of the vehicle, and the bumper armature is longitudinally aligned and positioned substantially above and parallel with respect to the cross beam of the subframe.

5. A vehicle having a framework which facilitates deformation during a collision to absorb energy and protect occupants of the vehicle, the vehicle comprising:
    a vehicle body including two longitudinal beams extending substantially parallel to a longitudinal axis of the vehicle, the two longitudinal beams each having a front end having a longitudinal beam crumple zone facilitating deformation thereof during a collision;
    a transverse impact absorbing member attached to and extending between the front ends of the two longitudinal beams;
    a disconnectable vehicle subframe supported by the vehicle body, the disconnectable subframe including two longitudinal subframe members spaced apart from one another and extending substantially parallel to the longitudinal beams, the two longitudinal subframe members each having a front end positioned substantially adjacent to and connected with the transverse impact absorbing member, and the front end of each of the two longitudinal subframe members having a subframe member crumple zone which facilitates deformation thereof during a collision; and
    the front end of a first one of the longitudinal beams is connected to the front end of a first one of the longitudinal subframe members by a first bracket, the front end of a second one of the longitudinal beams is connected to the front end of a second one of the longitudinal subframe members by a second bracket, and the transverse impact absorbing member is attached to the first and second brackets.

6. The vehicle according to claim 5, wherein the transverse impact absorbing member is a bumper armature.

7. The vehicle according to claim 5, wherein an intermediate portion of each of the longitudinal subframe members is attached to a cross beam.

8. The vehicle according to claim 7, wherein the transverse impact absorbing member is a bumper armature, and the cross beam extends substantially parallel to and vertically below the bumper armature.

9. The vehicle according to claim 5, wherein the vehicle body is resiliently mounted to the subframe in a manner to isolate the vehicle body from vibration generated by other vehicle components mounted on the subframe.

10. The vehicle according to claim 9, wherein the other vehicle components mounted on the subframe comprise at least one of a steering assembly, an anti-roll bar and a wheel suspension arm.

11. A vehicle according to claim 5, wherein the subframe is mounted to the vehicle body vertically below the two longitudinal beams.

12. A vehicle having a framework which facilitates deformation during a collision to absorb energy and protect occupants of the vehicle, the vehicle comprising:
    a vehicle body including two longitudinal beams extending substantially parallel to a longitudinal axis of the vehicle, the two longitudinal beams each having a front end having a longitudinal beam crumple zone facilitating deformation thereof during a collision;

a transverse impact absorbing member attached to and extending between the front ends of the two longitudinal beams;

a disconnectable vehicle subframe supported by the vehicle body, the disconnectable subframe including two longitudinal subframe members spaced apart from one another and extending substantially parallel to the longitudinal beams, the two longitudinal subframe members each having a front end positioned substantially adjacent to and connected with the transverse impact absorbing member, and the front end of each of the two longitudinal subframe members having a subframe member crumple zone which facilitates deformation thereof during a collision; and each of the longitudinal subframe members has a front portion and a rear portion, the front portions have a contour which facilitates deformation of the front portion in the event of a frontal impact of the vehicle prior to deformation of the rear portion, and the front portions are disconnectable from the rear portion to enable replacement of the front portions as desired.

13. A vehicle having a framework which facilitates deformation during a collision to absorb energy and protect occupants of the vehicle, the vehicle comprising:

a vehicle body including two longitudinal beams extending substantially parallel to a longitudinal axis of the vehicle, the two longitudinal beams each having a front end having a longitudinal beam crumple zone which facilitates deformation thereof during a collision;

a transverse impact absorbing member attached to and extending between the front ends of the two longitudinal beams, and the transverse impact absorbing member being a bumper armature;

a disconnectable vehicle subframe supported by the vehicle body, the disconnectable subframe including two longitudinal subframe members spaced apart from one another and extending substantially parallel to the longitudinal beams, each of the two longitudinal subframe members having a front end positioned substantially adjacent to and connected with the transverse impact absorbing member and having a subframe member crumple zone which facilitates deformation thereof during a collision; and a first vertical bracket connecting the front end of a first one of the longitudinal beams to the front end of a first one of the longitudinal subframe members, a second vertical bracket connecting the front end of a second one of the longitudinal beams with the front end of a second one of the longitudinal subframe members, the bumper armature being attached to the first and second vertical brackets.

14. The vehicle according to claim 13, wherein at least a portion of the front ends of the two longitudinal subframe members incorporates the subframe member crumple zone which extends rearwardly from the bumper armature.

* * * * *